July 21, 1959
W. E. MEISSNER
2,895,192
PROCESS FOR CLADDING OR PLATING METALS OR
OTHER BASE SHEETS AND THE LIKE
Filed Dec. 10, 1952
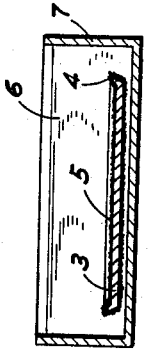
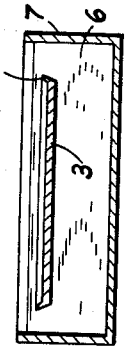
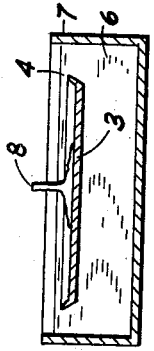
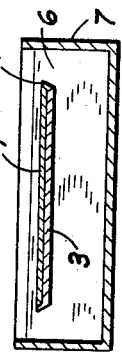
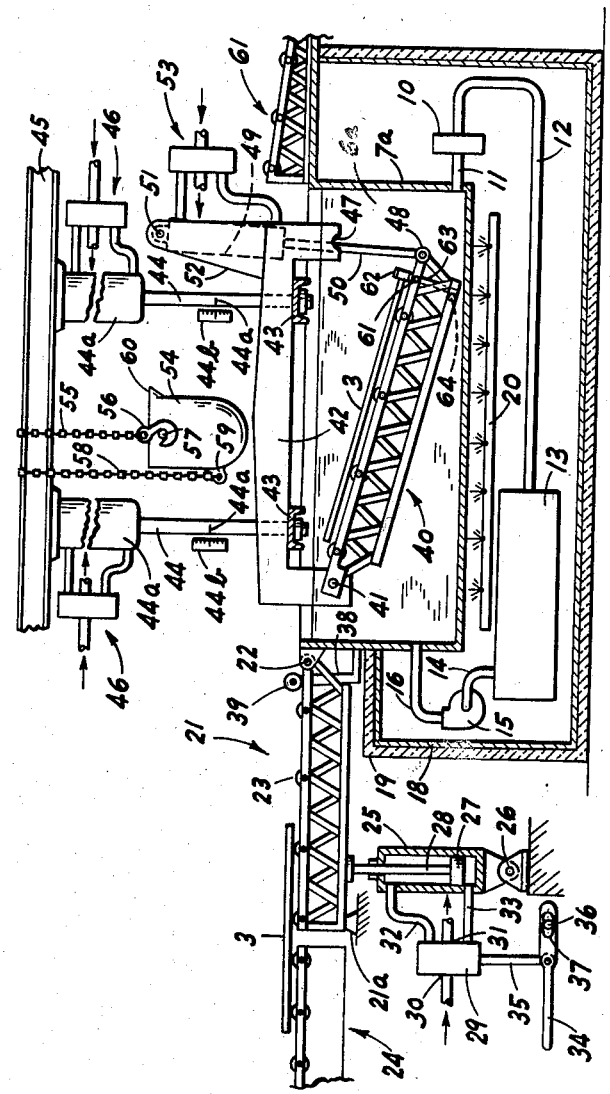
INVENTOR.
WILLIAM E. MEISSNER
BY
*Thomas R. Nolby*
ATTORNEY

United States Patent Office 2,895,192
Patented July 21, 1959

2,895,192

PROCESS FOR CLADDING OR PLATING METALS OR OTHER BASE SHEETS AND THE LIKE

William E. Meissner, New York, N.Y., assignor to American Viscose Corporation, Philadelphia, Pa., a corporation of Delaware Application December 10, 1952, Serial No. 325,193

7 Claims. (Cl. 22—204)

The present invention is concerned with a process for the production of laminated structures by coating or cladding a layer of fusible material upon a base layer of a material which is either infusible or of a sufficiently high melting point to allow the application of a molten mass of the first-mentioned material without softening or melting it. The invention is generally applicable to the cladding of base layers either of metal or of other materials such as plastics with another material in the molten state, such other material being either a metal or a fusible plastic material.

In many cladding operations of this general type, it has heretofore been impossible to apply a layer of a fusible material to a base layer of large size when the melting point of the fusible material is fairly high so that the base layer had to be raised to a rather high temperature. The elevation of such large base layers to relatively high temperatures, as in the cladding of iron or steel plates with lead at temperatures of about 650° F., for example, could not be performed satisfactorily because of the warpage of the base layer caused by the heretofore unavoidable and necessary application of localized heat on the base plate. Such large base layers had to be clad by a tedious procedure of applying a series of narrow strips of the cladding material one after the other and at times interrupting the operation to allow cooling in order to prevent warpage. In all of such cases, warpage is extremely pronounced when the sheet is flat.

It is an object of the present invention to provide a method for the cladding of large layers, even flat sheets, by a rapid mass operation involving the application of any thickness of the cladding material to one surface of the sheet in a single operation. It is a further object of the invention to provide a method for cladding large flat sheets of steel or the like with lead by applying molten lead to one entire surface of the steel in a single operation. It is a further object of the invention to eliminatae warping of a flat steel plate or sheet at the time it is clad with lead and to assure even cladding by providing uniformity of temperature throughout the plate or sheet in and during application of the cladding material. It is a further object of this invention to clad thin sheets, such as of 0.05 to 1/8 inch in thickness, as well as thick plates or sheets of steel. The cladding of thin sheets has heretofore been entirely impossible because of warping—only relatively heavy plates have withstood warpage to any reasonable extent. Other objects and advantages will be apparent from the drawing and the description thereof hereinafter.

In the drawing, which is illustrative of the invention,

Figure 1 is a side elevation with parts in section of an apparatus for carrying out the invention, Figure 2 is a sectional view of a detail, and Figures 3 to 7 inclusive are a series of views illustrating the sequence of operations involved in the process of the invention.

In the following description, reference will be had to the lead cladding of steel plates and sheets but it is to be understood that the operation is applicable generally to the production of coated, clad, or laminated structures comprising a base layer of one material, whether of metal or of a plastic, such as a synthetic resin plastic, and a coated or intermediate layer of a fusible material, either of a metal or a synthetic resin plastic, such as lead, vinyl resins, nylon or the like. When the layer of fusible material is an intermediate layer, the outer base layers may be of the same or of a different material. The use of the term "lead" herein is intended to include alloys of lead, such as hard lead.

In general, the system of the present invention comprises the sudden or rapid introduction of the base layer or sheet into a liquid bath of a molten substance which has a melting point lower than the melting point of the cladding material (and preferably but not necessarily above room temperature) and has a specific gravity less than the cladding material at and between the cladding temperature and the melting point of the cladding material. This quick immersion avoids the application of localized heat which would set up uneven stresses within the plate which in turn would warp the plate. This liquid bath comprises a substance which protects the base layer from decomposition, especially from oxidation. The liquid bath may and preferably does have a cleansing action on the base layer, particularly when the latter is of a metal. The substance of the liquid bath must be immiscible with the cladding material and preferably have no solvent action upon the material of the base layer or have such a slow solvent action thereon at the temperatures employed in the process of cladding as to dissolve a negligible part of the base layer. Molten salt baths are particularly valuable for this purpose, provided they are of non-oxidizing character, especially when applied for the cladding of metal base layers. In any event, the liquid bath may be of such character that it serves as a flux to facilitate the bonding of the cladding material to the material of the base layer.

Prior to immersion in such liquid bath, the base layer or sheet should be provided with a dam at its several edges, such as by clamping a strip of material to the upper surface adjacent the edges or by bending up a marginal rim of the base layer itself. In some articles of special shape, the base layer may already have an effective damming structure where needed to confine the fused cladding material in the proper area or areas upon the article. No special dam is in such cases needed.

When the material of the liquid bath has a melting point substantially above room temperature, the sudden immersion of the cold base sheet within the molten liquid having a temperature around the cladding temperature (which would be somewhat above the melting point of the cladding material) causes immediate coating of the sheet with a solidified mass of the material of the liquid bath. This layer, when formed, serves as an insulating or protective barrier to control the introduction of heat into the base layer from the liquid bath. This solid coating of the material of the liquid bath forms on all surfaces of the immersed sheet so as to control the rate and evenness of introduction of heat into the base layer from all sides. It serves to equalize the rate of introduction of heat so as to heat the entire base layer simultaneously from all sides at a substantially uniform rate thereby preventing warping. The formation of this solid coating upon the base layer is shown in Figure 3 wherein the base layer is indicated by reference character 3 its upturned rim by reference character 4 and the coating by reference character 5. The base layer is shown immersed in a liquid bath 6 within the liquid container 7. It is to be understood, however, that the formation of such a solidified layer 5 is not essential, and it is never formed when the heat transfer liquid in the bath has a melting point below room temperature.

After the base layer is introduced into the liquid bath 6, it is elevated to appropriate position in which it is adapted to trap or catch the fused cladding material and dispose it in the desired thickness over the area of the article to be clad whether such thickness be uniform or irregular. In the application to a flat sheet on which a uniform thickness is desired, the base layer is elevated to a horizontal position as shown in Figure 4 and allowed to reach the temperature of the liquid bath 6. Then, as shown in Figure 5, a stream 8 of the molten cladding material (preferably at approximately the temperature of the bath and the base layer) is poured into the bath 6 above the base layer 3 until it covers the base layer to the desired thickness, as shown at 9 in Figure 6. Instead of molten lead, a piece or pieces of solid lead, either cold or preheated, e.g. to approximately 575° F., may be introduced into the bath above the base layer. If it is desired to produce a three-layer laminate, a second base layer of the same or a different material than that of the layer 3 may be placed on top of the covered layer 3 while the cladding layer is still molten and capable of bonding to the layer thus superimposed. If the top layer thus applied has a higher specific gravity than the molten cladding or bonding material, it is necessary to apply several spacing elements, such as at the four corners and, if desired, in the middle of the assembly before application of the top layer.

While the coated base layer or laminated structure is thus held in the liquid bath 6, the bath is cooled to a point below the melting point of the cladding material so as to allow the cladding material to solidify. The cooling, however, is not allowed to proceed to a point below the melting point of the material of the liquid bath 6. Then, as shown in Figure 7, the clad or solid laminar product is removed from the liquid bath 6 for further cooling. At any desired time subsequently, the upturned edges 4 may be cut off or flattened back into the plane of the main body of the base layer 3 to be finished in any way desired.

While the molten cladding material is shown being introduced as a molten stream 8 in Figure 5, it may be introduced in the form of a solid mass of the cladding material directly above the plate 3 either at the same time the plate 3 is introduced or at any time between such introduction and the attainment of uniform temperature at the cladding level within the base layer 3 itself.

As pointed out above, the process requires the damming of the cladding material along the edges of the base layer and this dam may be produced merely by bending up the edges of the base layer as shown in Figures 3 to 7 or a special dam may be placed upon the sheet as shown in Figure 2. This special dam may comprise the clamping along each edge of the base layer 3 of a strip of material 10. This material 10 should be a material which is not affected by the temperatures employed during the cladding operation and it may be either a rigid or a flexible type of material. It is preferably quite flexible to facilitate a tight seal against the base layer 3 in which event it may be held down against the base layer by means of a strip of rigid material such as the angle iron 11. The strip 10 and/or the strip 11 may be held in place by suitable means such as bolts or C-clamps 12 shown.

When carrying out the above operation described in Figures 3 to 7 for cladding a flat steel plate of any large area by means of lead, the base sheet 3 is preferably cleaned so as to be free of all grease and, optionally but not necessarily, free of any oxide coating. The bath 6 into which it is introduced may be any one of a number of salt baths which are of non-oxidizing character. Preferably, it is of a reducing character which removes any oxide coating upon the base layer as it is introduced and also serves as a flux for the molten lead. As an example, it may consist of 60% zinc chloride, 20% potassium chloride, and 20% sodium chloride by weight. This bath has a melting point of about 400 to 425° F. and may be at a temperature of at least 640° F. and preferably 680 to 700° F. at the time of initial introduction of the steel sheet. At the time of pouring the stream of lead 8 or at some time before cooling the mass whether the lead is applied as a molten stream 8 or as solid strips or bars, the temperature of the bath 6 and the coated steel sheet 3 is held at 640 to 660° F., or an average of about 650° F. to allow the molten lead to flow out upon the steel sheet 3. It may in some instances be necessary to raise the temperature of the steel sheet 3 to its tempering temperature at around 1100° F. to assure the flattening out of the sheet if any sheet of steel warps after it reaches the bath temperature at time of immersion or is warped before immersing it in the bath. When this tempering is necessary, it is done before the lead is applied to the sheet and then the temperature of the system including the liquid bath and the base sheet is lowered to about 640 to 660° F. at which time the lead may be introduced.

After the lead has had an opportunity to flow out to the rim of the steel sheet and has covered it to the desired thickness, the system is allowed to cool down to about 450° F. or at any temperature below the melting point of the cladding material to cause the layer of cladding material to solidify while avoiding solidification of the bath 6. Then the clad sheet is removed as in Figure 7 and allowed to cool outside the bath 6 and trimmed or finished as mentioned hereinabove.

Of course, when base layers other than steel are of such nature that they tend to warp, and because of this require a tempering operation in order to eliminate warpage, naturally, the bath containing the base sheet is elevated to the appropriate tempering temperature for the particular material of which the base layer is formed and the system is held at that temperature until the sheet flattens out or warpage is removed after which the temperature of the system is lowered to the appropriate temperature for cladding with the particular cladding material involved.

Figure 1 shows diagrammatically a system of apparatus that may be employed for carrying out the invention commercially. As shown, the liquid bath 6a is supported in a container 7a and it may be circulated through a replenishing, fortifying or cleansing system that may comprise, for example, a filter 10 connected to the discharge pipe 11 from the container 7a. The filter 10 may be connected by a conduit 12 to a preheater 13 for raising the temperature of the clarified liquid. The preheater may be connected by a conduit 14 to a pump 15, the discharge port of which is connected by conduit 16 to the vessel 7a. This circulating system as well as the container 7a may be enclosed within the walls of a vented chamber 18 which may be insulated as at 19 and suitable heating devices may be disposed beneath the container 7a such as the gas burners 20. The recirculating system is a highly practical way of maintaining constancy and evenness of bath temperature and also of raising and lowering temperature at will and especially for replenishing heat level lost when cold plates of steel are immersed.

A tilting platform or table 21 pivotally mounted at 22 and provided with rollers 23 in its upper surface may be positioned adjacent one side of the container 7a. A conveyor system 24 may be provided for delivering the base layers to be clad onto the tilting platform 21. A pneumatic or hydraulic mechanism comprising a cylinder 25 swivelly mounted at 26 and a piston 27 connected by a rod 28 to the platform 21 may be employed to tilt the platform 21 about its pivot 22 after a base sheet has been deposited thereon. The fluid mechanism comprising cylinder 25 and so forth may be connected to a source of fluid pressure by a conventional four-way valve 29 having an inlet port 30, a discharge port 31 and delivery ports connected to opposite ends of the cylinder by flexible conduits 32 and 33. This spool valve 29 is conventional and may be operated by hand lever 34 connected to the valve by a valve rod 35. The lever may be fulcrumed upon a pivot 36 which fits within a slot 37 of the lever 34. Of course, instead of providing the manual lever 34 for operating the valve, any other suitable mechanism may be provided such as a solenoid which may be controlled by a switch disposed at the convenience of an operator.

A bracket 38 supports at its upper end a roll 39 whose axis of rotation is above the plane of the base layer disposed on the rollers 23. This roll 39 serves to limit the travel of the base layer 3 as it is being conveyed onto the platform 21. However, as the platform 21 is elevated about its pivot 22, the sheet 3 gradually rises above the axis of rotation of the roll 39 and when the angle of tilt has become sufficient, the weight of the base sheet 3 causes it to ride over roll 39 and enter the bath 6a where it slides down upon the tilt table or platform 40.

The platform 40 is pivotally mounted upon a transverse shaft 41 supported at its ends in a pair of frame members or beams 42 disposed adjacent, and having end portions projecting downwardly into, the lateral zones of the bath 6a. The frame members 42 are supported upon a pair of cross beams 43. A hydraulic or pneumatic lift rod 44 is disposed at each end of each rod 43 and is connected to a piston within one of the cylinders 44a carried upon suitable beams 45. Each of the four cylinders 44a are connected to conventional four-way spool valves 46 which are similar to valve 29 and have corresponding ports. These devices provide a fluid-operated lift for each of four corners of the support or carrier comprising the frame members 42 and transverse beams 43. Each of the downwardly extending portions at the right of members 42 is provided with a downwardly-facing bearing seat 47 adapted to be engaged by the outwardly projecting ends of the shaft 48 carried at the end of the platform or table 40. The bearings 47 may be provided with semi-circular seats to receive the upper surface of shaft 48 when the platform 40 is elevated which may be accomplished by the fluid-operated system comprising a pair of cylinders 49 each containing a piston connected to the piston rod 50 which is pivotally connected about an end of the shaft 48. Each cylinder 49 is swively mounted upon the ends of a cross shaft 51 which extends through upstanding brackets 52 carried on the frame members 42. A conventional spool valve 53 similar to valve 29 is connected to the opposite ends of the cylinders 49 to provide the proper control of the lifting and lowering action thereof upon the table or platform 40.

A ladle 54 may be suspended from an overhead crane by a chain 55 having hooks 56 supporting the outwardly extending trunnions 57 on the ladle. A chain 58 may be secured to a projecting member 59 at the back of the ladle near the bottom so that the ladle 54 may be tilted about its trunnions to pour the molten contents of cladding material out of the spout 60 downwardly into the container 6 over the base layer 3. The chain 58 may be connected to a block and tackle or to a suitable crane for tilting the ladle.

A shaft 61 rotatably mounted on an axis tranverse to the table 40 has fixedly secured thereto a barrier member 62 which limits the travel of a base layer 3 as it passes onto the table 40. At one end of the shaft 61 there is fastened a hand lever 63 and a reciprocable pin 64 in the table frame is adapted to be moved into or out of the way of the lever 63 so that the barrier 62 can be held in the retaining position shown or lowered by the operator when the table is in its upper position outside the bath and he desires to discharge the clad product onto a conveyor 61.

In operation, a base sheet 3, such as of steel, is conveyed such as by the conveyor 24 onto the lowered platform or table 21 the outer end of which rests upon a stationary bearing 21a until the sheet abuts against the roll 39. The operator then shifts the valve 29 to elevate the table 21 and when the desired tilt is obtained, the sheet 3 rides over the roll 39 into the bath over the table 40 which is in the inclined position shown. The base plate 3 proceeds down the platform 40 until it strikes the detent bar or bars 62 adjacent the lower end thereof. The operator then shifts the control valve 53 to swing the table 40 upwardly to a level position within the bath about its axis 41 until the shaft 48 rests in the bearings 47. Each of the rods 44 then may be checked to see that the index 44a thereon is at the same level which checking may be facilitated by comparing it with a fixed scale 44b. The indicia 44a are, of course, precalibrated to assure that when they are at the same height and the shaft 48 is up against the bearing 47, the upper plane of the table 40 on which the plate 3 rests is horizontal. When the operator has finished any adjusting necessary to assure that the platform 40 and plate 3 are horizontal, the ladle 54 is brought over the bath and tilted to pour the desired amount of molten cladding material such as lead onto the base layer 3 carried on the platform 40. The temperature of the bath 6a and the base layer 3 therein, if not already at proper cladding temperature, is brought to such temperature by the heating means such as the burner 20 or by cooling. If the base sheet requires its being brought to tempering temperature, this may be accomplished by operation of the burner 20 and thereafter the system cooled until cladding temperature is reached at which time the cladding material at approximately bath temperature is poured from the ladle upon the base layer while the latter is held horizontally within the bath.

The system, in either case, is then allowed to cool after turning off the burners until the layer of cladding material has solidified. Thereafter, the clad product is lifted completely out of the bath for further cooling by operation of the fluid cylinders 44a. After being lifted out of the bath, the right end of table 40 may be lowered and the detents 40a may be swung out of the way to allow the plate 3 to be slid onto a discharge conveyor 61 at the right hand side of the container 7a. Thereafter, the system may be shifted to the initial positions for repeating the operation with additional plates.

It is to be understood that changes and variations may be made without departing from the spirit and scope of the invention as defined in the appended claims.

I claim:

1. The method of applying a layer of metallic fusible material to a surface of a metallic base layer comprising providing a bath of a molten substance having a melting point below the melting point of the fusible material and a specific gravity at and between such melting points less than the specific gravity of the fusible material, heating the bath to a temperature above the melting point of the fusible material, immersing the entire base layer into the bath, introducing the fusible material into the molten bath above the immersed base layer while the latter is positioned substantially horizontally to receive the fusible material on its uppermost surface whereby the fusible material flows and covers the surface of the base layer to the desired thickness, cooling the bath while the covered base layer is held in said immersed position until the covering layer of fusible material is solidified, and finally removing the base layer with its solidified coating of fusible material thereon from the bath for further cooling.

2. The method as defined in claim 1 in which a dam is provided about all edges of the base layer before it is immersed within the molten bath.

3. The method of producing lead clad steel plates comprising completely immersing a flat steel plate within a liquid bath of a molten substance having a temperature of 640 to 700° F. and a specific gravity less than that of molten lead at the same temperature, introducing lead into such bath above the steel plate while the latter is held horizontally beneath the surface of the bath and in a position to receive the lead which forms a coating thereon, cooling the bath until the coating of molten lead solidifies and removing the coated steel plate from the liquid bath for additional cooling.

4. The method of producing lead clad steel comprising providing a base sheet of steel with a dam around its edges, completely immersing the steel sheet within a liquid bath of a molten substance at a temperature of about 680 to 700° F., positioning the steel sheet horizontally within the bath, introducing molten lead into the bath and onto the uppermost surface of the horizontally positioned steel sheet to coat the same, bringing the bath and the lead coated steel sheet to a temperature of about 640 to 660° F. while the steel sheet is held in its immersed horizontal position, cooling the bath to a temperature above the melting point of the liquid bath but below the fusion temperature of lead to solidify the lead coating on the sheet, and then removing the lead clad sheet from the liquid bath.

5. The method for producing lead clad steel comprising completely immersing a base layer of steel within a bath of a molten material having a melting point below that of lead and which is at a temperature of at least 400° F., disposing the base plate in a horizontal position within the bath, introducing lead into the bath and onto the uppermost surface of the immersed base plate while the latter is held horizontally, at some time while the lead is in contact with the upper surface of the base plate bringing and maintaining the temperature of the plate and the lead at about 640 to 660° F. to cause the lead to flow out and coat the base plate, cooling the bath to a temperature above the melting point of the liquid bath and below the melting point of the lead to solidify the lead, and then removing the clad plate from the liquid bath.

6. The method as defined in claim 5 in which the lead is preheated to a temperature of about 575° F. but is not melted before it is introduced into the bath.

7. The method for producing a clad lead base plate of steel in accordance with the method of claim 6 in which the base plate, after immersion within the molten bath, is heated therein to its tempering temperature of approximately 1100° F. to relieve strains and eliminate warpage causing the same to flatten and then the bath is cooled to a temperature in the range of 640 to 660° F. and the lead is introduced into the bath above the surface of the immersed plate while it is held at that temperature and is disposed in a horizontal position.

References Cited in the file of this patent
UNITED STATES PATENTS

| | | |
|---|---|---|
| 971,135 | Monnot | Sept. 27, 1910 |
| 2,174,733 | Chace | Oct. 3, 1939 |
| 2,265,243 | McCullough et al. | Dec. 9, 1941 |
| 2,276,101 | Schueler | Mar. 10, 1942 |
| 2,315,725 | Moller | Apr. 6, 1943 |
| 2,493,754 | Dorfan | Jan. 10, 1950 |
| 2,515,191 | Carpenter et al. | July 18, 1950 |
| 2,579,073 | Harris | Dec. 18, 1951 |
| 2,628,393 | Knapp | Feb. 17, 1953 |
| 2,751,311 | Rosseau | June 19, 1956 |